UNITED STATES PATENT OFFICE.

WILHELM PICKHARDT, OF NEW YORK, AND HERMANN ENDEMANN, OF BROOKLYN, N. Y.

TARTRATE OF OXYCHINOLINE.

SPECIFICATION forming part of Letters Patent No. 257,828, dated May 9, 1882.

Application filed March 21, 1882. (Specimens.)

To all whom it may concern:

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in Medical Compounds, of which the following is a specification.

This invention relates to a medical compound prepared by the action of tartaric acid on the oxychinoline described in Letters Patent No. 237,918, granted to Z. H. Skraup, February 15, 1881.

In carrying out our invention we take one hundred and forty-five parts, by weight, of Skraup's oxychinoline, prepared from paranitrophenol, as described in the Patent No. 237,918, above named, and stir the same into a boiling solution of one hundred and fifty parts of tartaric acid in four hundred and fifty parts of water. When the oxychinoline has been completely dissolved the solution is set aside for crystallization, which takes place on cooling. If the crystals should be colored, they can be decolorized by recrystallization and treatment with animal-charcoal.

The tartrate of oxychinoline obtained by the above treatment gives the reactions of tartaric acid and those of oxychinoline. It is quite soluble in hot water and but little soluble in cold water. It is soluble in alcohol. From its solutions it crystallizes in concentrically-grouped needles.

The principal advantage of our compound is that the same dissolves freely in hot water, and it can therefore be administered in solution, while the oxychinoline itself is almost insoluble in water, and in its pure state can be administered only in the form of a powder.

What we claim as new, and desire to secure by Letters Patent, is—

The tartrate of oxychinoline prepared by the action of tartaric acid upon the oxychinoline of Skraup, substantially in the manner above set forth.

In testimony whereof we have hereunto set our hands and seals in the presence of two subscribing witnesses.

WM. PICKHARDT. [L. S.]
H. ENDEMANN. [L. S.]

Witnesses:
W. HAUFF,
E. F. KASTENHUBER.